Nov. 18, 1969   E. A. COOK   3,478,435
DEPTH GAUGE FOR MEASURING THE THICKNESS OF ANIMAL TISSUES
Filed March 11, 1968

INVENTOR.
EDMOND A. COOK
BY
Sheridan and Ross
ATTORNEYS

United States Patent Office 3,478,435
Patented Nov. 18, 1969

3,478,435
DEPTH GAUGE FOR MEASURING THE THICKNESS OF ANIMAL TISSUES
Edmond A. Cook, Box 926, Pine Bluffs, Wyo. 82082
Filed Mar. 11, 1968, Ser. No. 712,037
Int. Cl. G01b 3/22, 5/02
U.S. Cl. 33—169                                1 Claim

ABSTRACT OF THE DISCLOSURE

A depth gauge for measuring the thickness of animal tissue layers, such as, layers of fat and muscle or lean tissue, comprising a scale, and a cursor slidably mounted thereon having a probe attached thereto for penetrating the layer of animal tissue to be measured, the cursor having an indicator cooperating with the scale to indicate the depth of penetration of the probe. An improvement is the use of a cannula for seating in the animal skin to provide a conduit in the skin through which the probe operates.

SUMMARY OF THE INVENTION

The invention relates to a depth gauge for measuring the thickness of animal tissue.

The invention will be illustrated by its application in measuring the thickness of fat and muscle tissue in beef; however, it is by no means limited in use to cattle, as it can be used on all types of animals.

Fat on an animal used for human consumption, such as cattle, sheep, hogs, etc., is an undesirable waste component as the general public does not eat fat, and fat from cattle and sheep particularly is of minimum value compared with muscle or lean meat. This emphasizes the importance of producing edible livestock with a minimum of fat and a maximum of lean red meat to avoid the loss incurred by both retailer and consumer due to the excess fat on these animals.

Attempts have been made to control the development of production of relative amounts of fat and lean meat in domestic animals by selective choice of animal foods; however, such programs have apparently resulted only in a development of excess fat. Failure of selective feeding programs to produce desired results has resulted in the conclusion that the best approach is based on genetic and hereditary considerations with selective breeding being used to develop strains of livestock having a comparatively large portion of lean red meat to fat.

Some early selective breeding programs were designed to obtain this objective through information gained from the slaughter of progeny. Obviously, if the selective breeding program is to be successful, there must be a means available for determining the amount of fat and lean red meat on the live animal. Determination of this factor from the carcass is unsatisfactory because once the animal has been slaughtered it is too late to take advantage of the genetic potential it may have possessed, particularly in the case of female animals, as artificial insemination is not applicable to them. A practical method for evaluating the fat and lean content of live animals should be rapid, inexpensive, accurate and suitable for widespread use. None of the methods used in the past have met all of these qualifications.

Methods based on determination of body water, creatinine or lipid levels, and various biopsy techniques are intricate laboratory procedures requiring highly trained personnel and are, therefore, expensive and time-consuming. Linear measurements and visual estimations have lacked accuracy. Ultrasonics and scintillation-counting devices which have been used for this purpose are expensive. Progeny testing with carcass evaluation is expensive, time-consuming and laborious to apply due to the long generation interval and low reproductive rate of cattle, and the high value of the individual animals sacrificed for carcass information makes the expense of this method prohibitive. Methods based on the use of the local anesthetic followed by making a slit and measuring the depth of layers with a ruler have been unsatisfactory because they are inaccurate as demonstrated by the low correlation of results to corresponding carcass measurement results. Use of a probing device whose operation is based on relative electroconductivity of various tissue layers is unsatisfactory in beef because false readings occur from penetration of the numerous blood vessels found in beef fat, and because it is very difficult to penetrate heavy beef hides with an electroconductive probe without bending the probe.

Accordingly, it is an object of this invention to develop a method and apparatus for determining the thickness of layers of fat and lean meat tissues in live animals and carcasses.

Another object of this invention is to provide a method and apparatus as stated which is inexpensive, accurate, rapid, and which is suitable for widespread use.

It is another object of this invention to provide a depth gauge for measuring the thickness of various layers of fat and lean or muscle tissue in live animals which utilizes a probe to penetrate the various layers of tissue provided with a scale and indicator means from which the depth of the probe into the tissue can be readily determined.

The above and other objects are accomplished by a depth gauge comprising a support member having a measuring scale thereon to which is slidably attached a cursor member carrying an indicating means cooperating with the scale and support member, and a probe attached to the cursor for penetration of the various layers of tissue of the animal. An improvement is the use of a cannula which is seated in the skin of the animal where it serves as a channel through which the probe operates.

The invention is best understood by reference to the accompanying drawing, hereby made a part of this specification, and in which.

Figures 3, 4:
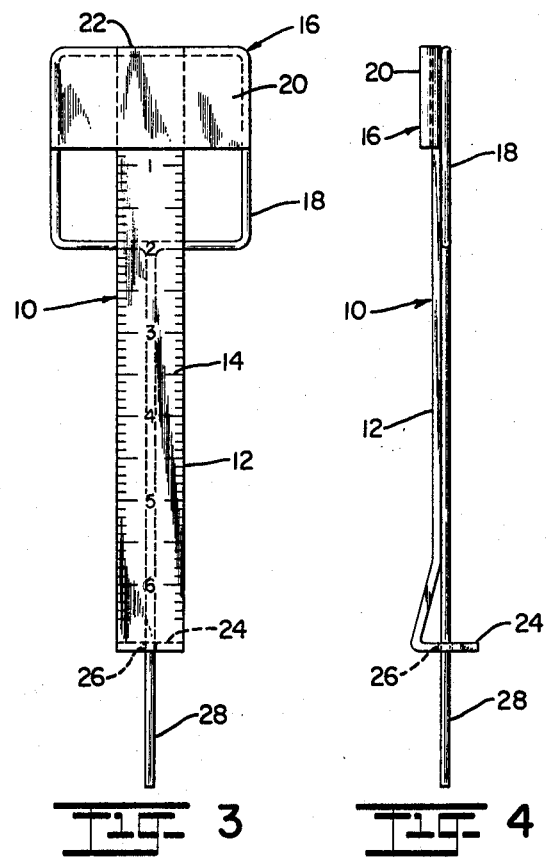
FIGURE 3 is a front elevational view of the depth gauge of the invention.
FIGURE 4 is a side elevational view of the depth gauge of the invention.

Referring to the figures, the assembled depth gauge as shown in FIGURE 3 is represented by the numeral 10. The gauge comprises support member 12 provided in this case with marking indicia 14 thereon constituting a scale. Other special combinations of support element and scale may obviously be used.

Slidably assembled with the support member 12 is a cursor 16 constructed of hollow rectangular frame 18, preferably, but not necessarily of tubular material, to which is welded a cap sheet 20 of metal, plastic or other suitable material. The cap sheet 20 terminates at its upper extremity in a straight horizontal edge 22 serving as an indicating line 22 cooperating with the scale or indicia 14. Cap sheet 20 is secured to the frame 18 by any suitable conventional manner. The structure of the cursor is not restricted to that described as it may take any operable form, rectangular or otherwise, and may even consist of a single horizontally mounted element. It must include an indicating means cooperating with the measuring indicia 14 on support member 12.

Figure 5:
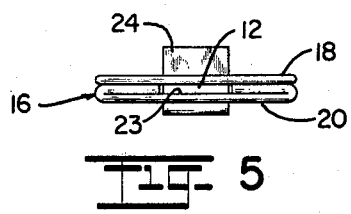
FIGURE 5 is a top end view of the depth gauge of the invention.

As shown in FIGURE 5, a slot 23 is formed between the ends of the cap sheet 20 and frame 18 in which support member 12 travels and which permits relative movement between the cursor and the support member and holds the two in assembled relationship. The bottom of support member 12 is constructed in the form of a foot 24 having a hole 26 for purposes to be explained later.

For penetration of the animal's tissues in the thickness measuring operation, a probe 28 is attached to the bottom of frame member 18. The probe, which may have a blunt end or a sharp end, passes through hole or guide 26 in foot 24 to provide for its proper alignment with respect to support member 12 and to keep the cursor, probe and support member in assembled relationship.

Figure 2:
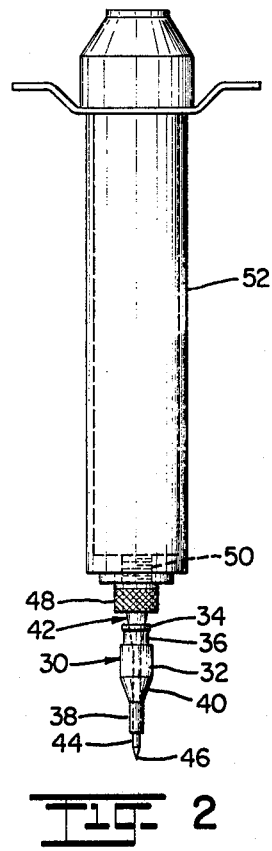
FIGURE 2 is a front elevational view of a syringe having a trocar with a cannula positioned over it for seating of the cannula in the skin of the animal.

For providing a channel through which the probe may operate and to keep the probe out of contact with the skin of the animal, a cannula 30 may be seated in the skin of the animal at the point of entry of the probe. The cannula 30 as shown in FIGURE 2 is comprised of a hollow cylindrical body portion 32 connected at its top to a rim 34 by means of a reduced portion 36 and to a front guide section 38 at its other end through sloping shoulder 40. For providing a hole in the animal skin and seating the cannula 30 therein, a trocar 42 is used in conjunction with the cannula 30. The trocar 42 comprises a needle 44 having a sharp point 46 at one end and provided at the other end with an expanded knurled portion 48 having a threaded extension 50 attached thereto for attachment of the needle to a syringe 52.

Figure 1:
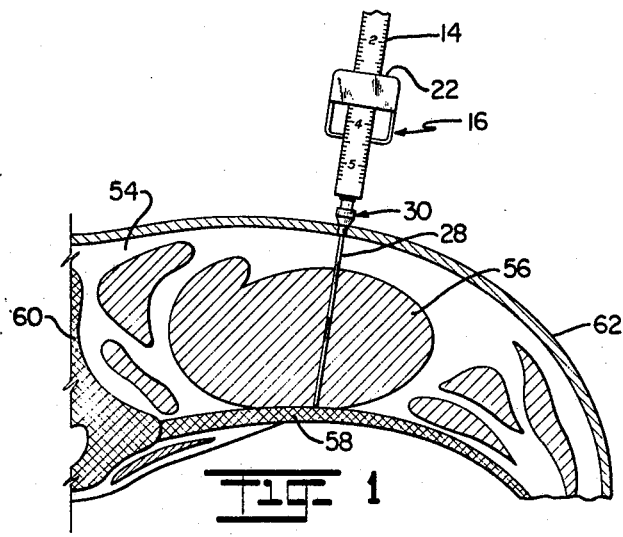
FIGURE 1 is a partial transverse section of a side of beef through the twelfth thoracic vertebra.

Referring to FIGURE 1, the use of the gauge device in a typical operation of measuring the thickness of fat and lean layers of beef is shown. In this example, the measurement is made of the thickness of the subcutaneous fat layer 54 and the l. (longissimus) dorsi muscle 56 over the twelfth rib 58 in the vicinity of the twelfth thoracic vertebra 60, the probe being shown passing through cannula 30 seated in skin 62 and extending through the fat layer 54 and the muscle 56 and its downward movement being stopped by the twelfth rib 58.

In operation, the cannula 30 is first seated in the animal skin 62 at the point of penetration of the probe 28. In performing this operation, the trocar 42 is attached to the end of a suitable syringe 52 by means of threaded section 50 and mating female threads in the syringe. The cannula 30 is next positioned over the trocar 42. The point 46 of needle 44 is then passed through the animal's skin 62 followed by seating of the cannula 30 in the hole through the skin made by the needle 44. The syringe 52 and trocar 42 are then withdrawn leaving the cannula 30 seated in the animal's skin at the point at which the tisssue layers are to be measured. The length of the cannula substantially equals the thickness of the skin of the animal.

After the cannula has been seated, the depth gauge having a probe with a blunt end is used to measure the thickness of fat layer 54. The probe is forced through the soft subcutaneous fat layer 54 perpendicular to the surface until it contacts the dorsal fascia of the l. dorsi muscle. The support member 10 carrying the scale is then forced down until its bottom edge rests on the top of cannula 30. The probe is then removed and the reading recorded as the depth of the subcutaneous fat. The blunt probe is then removed and the sharpened probe inserted in the cannula and forced down through the fat layer 54 and the l. dorsi muscle until it contacts the upper surface of the twelfth rib 58. The support member with the scale thereon is slipped down until its bottom edge contacts the surface of cannula 30 after which it is removed and the reading indicated on the scale 14 by the edge 22 is recorded as the combined depth of back fat and l. dorsi. The depth of the l. dorsi can then be determined by subtracting the fat depth or thickness from the total depth reading of the sharp probe.

The following example illustrating a successful application of the probe is submitted for the purpose of illustration, and is in no way limiting as to the applications of the probe.

Tests with the depth gauge were made on a group of fifty-nine yearling Hereford steers which were on feed trials. The measurements with the depth gauge were made to test the instrument and techniques employed in its use, and are not related to the results of the feed trial. The average initial weight of the steers was 314 kilograms and the final average weight was 495 kilograms. Measurements of the back fat and l. dorsi depths were taken with the depth gauge at the beginning of the feeding period, approximately 48 hours before slaughter of the steers and on the steer carcasses.

The trocar used had a 1.6 millimeter point and was fitted with a 14 gauge cannula, 7.8 mm. in length, this length being the average value for skin thickness of Hereford steers at slaughter weight. One probe was blunt for measuring the fat layer and the other probe had a sharp conical point for measuring the muscle layer. Both of the probes were fitted with a stainless steel scale or support member which gave a correct reading of the penetration depth of the probe. The probes were calculated to read depths from the inside of the skin using the average skin thickness cited above. The trocar was fitted to extend a veterinary hypodermic syringe luer tip and attached to a hypodermic syringe which served as a handle for the instrument, this arrangement being illustrated in FIG. 2.

The steers were restrained in a steel chute and their individual identification numbers recorder. The instruments were thoroughly cleansed and placed in a 0.4 percent solution of Nolvasan. The probe site was located directly over the twelfth rib (12.7 cm. from the dorsal process of the twelfth thoractic vertebra). The distance was measured by a steel ruler and the rib was located by palpation. The probe cite was then washed with a detergent solution and rinsed with a 70 percent solution of isopropyl alcohol. The cannula was then seated in the skin at the probe site in the manner described above. The blunt probe was then inserted through the cannula and forced through the soft subcutaneous fat layer perpendicular to the surface until it came in contact with the dorsal fascia of the l. dorsi muscle. The probe was then tapped lightly and released for an instant to allow it to become stabilized before the reading was taken. The support member bearing the scale was then slipped down on top of the cannula, the probe removed and the reading recorded as the depth of subcutaneous fat. The blunt probe was then replaced by the pointed probe which was inserted in the cannula and forced down through the l. dorsi muscle until it came in contact with the surface of the twelfth rib.

The scale was then slipped down to the surface of the cannula, the probe removed and the reading recorded as the combined depth of back fat and l. dorsi. The depth of the l. dorsi was then determined by subtracting the fat depth from the total depth of the last probe. The thickness of fat and lean were then calculated for the total probe depth. As the substantial shape of the l. dorsi is known, the total area of the l. dorsi can be calculated after its thickness is known. After the steers were slaughtered, accurate measurements of the fat and lean layers were made with a ruler, this being feasible as the location of the measurements is where the front and rear quarters are separated. Highly significant correlation was found between the results obtained on live animals with the probe and those obtained on carcasses, proving that the depth gauge of the invention is highly accurate for measurement on live animals.

It is apparent from the above description, that the depth gauge of the invention is an extremely accurate instrument for measuring the thickness of fat and muscle layers in live animals. Further, it is suitable for widespread use by ranchers and others not necessarily trained in veterinary science, as its use is simple. It can be used rapidly as its use does not involve application of complicated and expensive equipment. Further, it is inexpensive in construction and can be economically manufactured by simple manufacturing techniques. A further advantage is that the cannula through use of the trocar can be seated with standard syringes which are used for other purposes, so that an additional use has been added for the syringe.

It is to be understood that this invention is not limited to the exact embodiments of the methods and apparatuses shown and described, which are merely by way of illustration and not limitation, as various other forms and modifications will be apparent to those skilled in the art.

I claim:
1. A gauge for measuring the thickness of layers of fat and muscle in an animal comprising: an elongated scale member; a cursor slidably mounted on said scale member with one of its edges indicating its position relative to said scale member; said cursor comprising a cap sheet positioned over a frame with a central slot formed between the top of said frame and said cap sheet to slidably receive said scale member; a probe attached at one end to said cursor and its other end adapted to penetrate the body of an animal; a foot at the bottom of said scale member substantially perpendicular to said scale member having a hole therein; said probe passing through said hole and thereby supported in vertical orientation.

References Cited

UNITED STATES PATENTS

| | | |
|---|---|---|
| 490,860 | 1/1893 | Snoech. |
| 1,327,114 | 1/1920 | Rhein. |
| 1,679,473 | 8/1928 | Kabisuis. |
| 2,001,638 | 5/1935 | Tornsjo _____ 128—347 |
| 2,486,629 | 11/1949 | Beaver. |
| 2,763,935 | 9/1956 | Whaley et al. |
| 3,170,243 | 2/1965 | Williams. |
| 3,241,554 | 3/1966 | Coanda _____ 128—350 |

FOREIGN PATENTS

| | | |
|---|---|---|
| 79,517 | 12/1918 | Switzerland. |
| 69,902 | 7/1893 | Germany. |

HARRY HAROIAN, Primary Examiner